Aug. 17, 1926.

L. SCHULER 1,596,027

DYNAMO ELECTRIC MACHINE

Filed March 5, 1924

INVENTOR
Leo Schuler
BY E. E. Huffman
ATTORNEY

Patented Aug. 17, 1926.

1,596,027

UNITED STATES PATENT OFFICE.

LEO SCHULER, OF BERLIN-LICHTERFELDE, GERMANY, ASSIGNOR TO WAGNER ELECTRIC CORPORATION, OF ST. LOUIS, MISSOURI, A CORPORATION OF DELAWARE.

DYNAMO-ELECTRIC MACHINE.

Application filed March 5, 1924, Serial No. 696,920, and in Germany November 20, 1923.

My invention relates to dynamo electric machines and particularly to self-excited synchronous motors, self-excited compensated asynchronous motors, and converters. In such machines it is desirable that the excitation voltage be low in order that too high a voltage will not exist between commutator segments, and in the exciting winding during the starting operation. In the larger machines (approximately 25 H. P. and greater) the use of the usual drum windings on the rotor will result in too high a voltage between adjacent commutator segments, because in such a machine there may be a pressure of five volts induced in one turn of a rotor coil, and if the proper exciting voltage for normal operation is fifteen volts, then only three rotor coils in series could be used, which would mean that a machine provided with a drum exciting winding would have only three commutator segments per pole. Such a machine would have unsatisfactory commutation.

The object of my invention is to increase the number of commutator segments for a given voltage to such extent that sparkless operation of the machine at starting and at all loads can be secured. Speaking generally I accomplish this by providing the inducing member, which is usually the rotor, with an inducing winding, and with a ring winding for the production of the exciting E. M. F.

Figure 1:
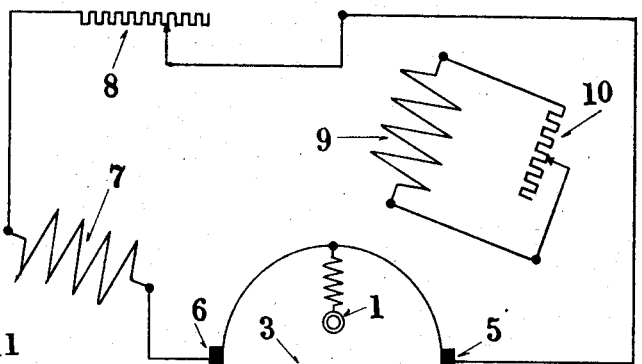
Figure 2:
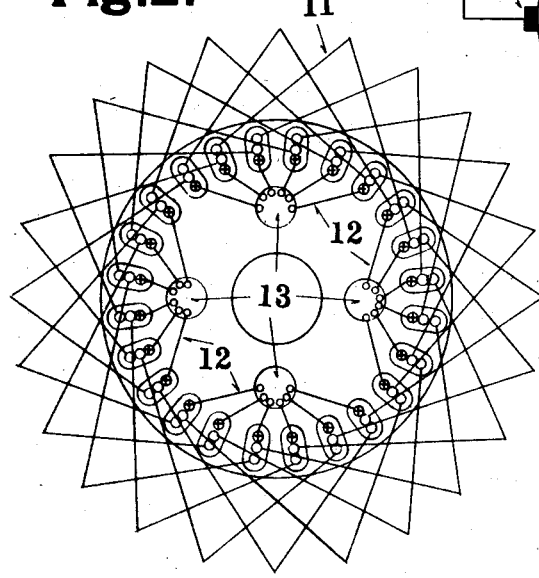
Figure 3:
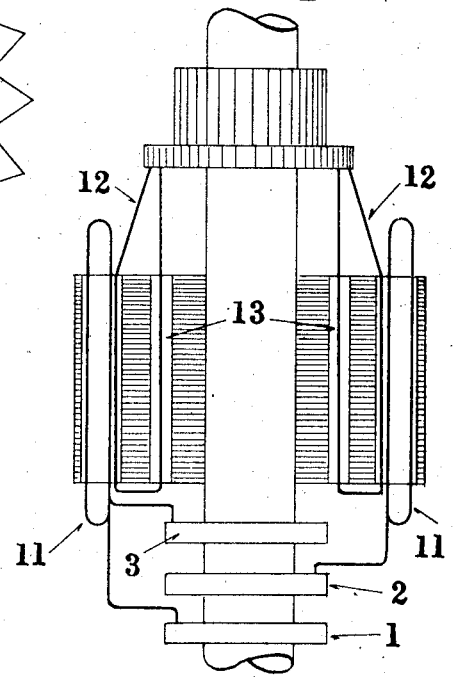

In the accompanying drawings Figure 1 illustrates a self-excited synchronous motor, of a type to which my invention is applicable; Figure 2 is a diagrammatic illustration of a rotor winding arrangement embodying my invention; and Figure 3 is a view partly cross-sectional and partly diagrammatic showing the disposition of the windings in the rotor laminæ.

Referring first to Figure 1, the rotor is provided with a polyphase winding supplied with line current through slip rings 1, 2 and 3. Direct current exciting E. M. F. derived from the commuted winding 12, through brushes 5, 6, is supplied to the exciting winding 7 on the stator, this exciting winding being displaced from the axis of the brushes 5, 6. To start the machine resistance 8 is included in the exciting circuit and the starting winding 9 is closed on itself through adjustable resistance 10. In normal operation the resistances 8 and 10 may be cut out and the winding 9 may be open-circuited if desired. However, it is preferable that the winding 9 be short-circuited during normal running condition in order that the machine may continue to operate satisfactorily as an induction motor if the load should increase sufficiently to pull it out of synchronism.

In Figure 2 I show a winding arrangement embodying my invention in which the inducing winding 11 connected to slip rings 1, 2 and 3 is of the usual drum type distributed in the peripheral rotor slots. The commuted winding 12 is a ring winding having its outer conductors in said slots, and its inner conductors disposed in openings 13 through the rotor laminæ. These openings 13 may be positioned close to the rotor shaft but I prefer to position them at some distance from the shaft whereby they will not embrace all of the rotor flux. The ring winding may be physically separate from the inducing winding, or may be interconnected therewith in a suitable manner such, for example, as shown in Figure 1. It will be understood that the crossing lines on the outer conductors of the winding 12 are for identification and are not intended to indicate current direction therein.

By the arrangement described the number of commutator segments per pole may be twice as great as if the exciting conductors were drum wound and thus the voltage between the commutator segments may be one-half as great. The voltage in the ring exciting winding is also further decreased by the fact that this winding when disposed as in Figure 2, does not embrace all of the rotor flux. It will be understood from the foregoing that by the use of the arrangement described I may select a suitable number of turns and suitable disposition of the winding openings 13 in the rotor to secure the desired value of exciting voltage for normal operation.

While I have described my invention as applied to a synchronous motor, it is also applicable to other machines including a compensated asynchronous motor in which low frequency alternating currents rather than direct current are supplied from the commutator to the exciting winding on the induced member. By the expression "ring winding" herein I mean a winding having its conductors so located that a portion of each turn between adjacent segments is located at substantially greater distance from the air gap than other portions of said turn.

Having fully described my invention, what I claim as new and desire to secure by Letters Patent of the United States is:

1. An alternating current motor having one of its members provided with an alternating current winding and with a commuted ring winding, the conductors of the ring winding being so located as to embrace a portion only of the magnetic flux passing through said member.

2. In an alternating current motor, the combination with a member provided with an exciting winding, of a member provided with an inducing winding and with a commuted ring winding, said ring winding being in circuit with the exciting winding, and the inner conductors of the ring winding being so located as to embrace a portion only of the magnetic flux passing through the member carrying the inducing winding.

3. In an alternating current motor, the combination with a member provided with an exciting winding, of a member provided with an inducing winding, a commuted ring winding on said last named member and in circuit with the exciting winding, the conductors of the ring winding being so located as to embrace a portion only of the magnetic flux passing through the member carrying the inducing winding, and the outer conductors of the ring winding passing through peripheral slots in the said last named member.

4. An alternating current motor having one of its members provided with a drum winding and with a ring winding, a portion of the conductors of the ring winding being located in peripheral slots in the inducing member, and another portion of its conductors being displaced from said slots, and means for supplying an alternating current E. M. F. to the drum winding.

In testimony whereof, I have hereunto set my hand this the 7th day of February 1924.

LEO SCHULER.